(12) United States Patent
Packer et al.

(10) Patent No.: US 6,205,120 B1
(45) Date of Patent: *Mar. 20, 2001

(54) METHOD FOR TRANSPARENTLY DETERMINING AND SETTING AN OPTIMAL MINIMUM REQUIRED TCP WINDOW SIZE

(75) Inventors: Robert L. Packer; Guy Riddle, both of Los Gatos, CA (US)

(73) Assignee: Packeteer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,776

(22) Filed: Mar. 13, 1998

(51) Int. Cl.$^7$ .................................................. H04L 12/26

(52) U.S. Cl. ............................................ 370/235; 370/253

(58) Field of Search .................................... 370/229, 231, 370/235, 236, 252, 253, 389, 400

(56) References Cited

U.S. PATENT DOCUMENTS

| | | | | |
|---|---|---|---|---|
| 5,014,265 | * | 5/1991 | Hahne et al. | 370/236 |
| 5,193,151 | * | 3/1993 | Jain | 709/237 |
| 5,408,465 | * | 4/1995 | Gusella et al. | 370/231 |
| 5,526,353 | * | 6/1996 | Henley et al. | 370/392 |
| 5,612,949 | * | 3/1997 | Bennett | 370/253 |
| 5,668,951 | * | 9/1997 | Jain et al. | 709/235 |
| 5,764,625 | * | 6/1998 | Bournas | 370/231 |
| 5,802,106 | * | 9/1998 | Packer | 370/229 |

* cited by examiner

*Primary Examiner*—Chau Nguyen
*Assistant Examiner*—Jasper Kwoh
(74) *Attorney, Agent, or Firm*—Townsend and Townsend and Crew LLP; Kenneth R. Allen (57) ABSTRACT

A method is provided for optimally setting the receiver window size in a flow controlled protocol in order to minimize queuing in a packet telecommunications network. Embodiments according to the present invention are operable at an explicit path to identify per connection information from host address or physical interface, flow direction, or any combination of these elements. The present invention may function in conjunction with a rate detection method that determines both a message serialization delay component and a data size invariant delay component.

15 Claims, 5 Drawing Sheets

METHOD FOR TRANSPARENTLY DETERMINING AND SETTING AN OPTIMAL MINIMUM REQUIRED TCP WINDOW SIZE

CROSS-REFERENCE TO RELATED APPLICATIONS

This application makes reference to the following commonly owned U.S. Patent Applications, which are incorporated herein in their entirety for all purposes:

Copending U.S. patent application Ser. No. 08/742,994, in the name of Robert L. Packer, entitled "Method for Explicit Data Rate Control in a Packet Communication Environment Without a Data Rate Supervision," relates to a technique for automatically scheduling TCP packets for transmission;

Copending U.S. patent application Ser. No. 08/762,828, in the name of Robert L. Packer, entitled "Method for Rapid Data Rate Detection in a Packet Communication Environment Without Data Rate Supervision," relates to a technique for automatically determining the data rate of a TCP connection; and, Copending U.S. patent application Ser. No. 08/970,693, in the name of Robert L. Packer, entitled "Method for Minimizing Unneeded Retransmission of Packets in a Packet Communication Environment Supporting a Plurality of Data Link Rates," filed Nov. 14, 1997, relates to a technique for reducing retransmissions of packets resulting from improperly configured default RTO parameters.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

PAPER APPENDIX

The following paper appendices are included herewith and incorporated by reference in their entirety for all purposes:

Appendix A: Pseudo code listing of an embodiment of the invention comprising five (5) sheets.

BACKGROUND OF THE INVENTION

This invention relates to digital packet telecommunications, and more specifically to methods for minimizing packet queuing based upon automatically determined characteristics of the underlying network connection.

The TCP/IP protocol suite is employed in the Internet, a world-wide data communication network environment, and is also employed in local networks called Intranets. TCP technology intentionally omits explicit supervisory function over the rate of data transport over the various media comprising the network. While there are certain perceived advantages, this characteristic has the consequence of juxtaposing very high-speed packets and very low-speed packets in potential conflict, which results in inefficiencies. Resulting problems of latency and bandwidth constraints manifest themselves in delay, lost information and unsatisfied users.

The Transmission Control Protocol (TCP) provides a reliable session-based service for delivery of sequenced packets of information across the Internet. One method employed to provide reliability is to expect each end to acknowledge the data received from the other end. However, data segments and acknowledgments can be lost. To solve this problem, TCP sets a time-out when it sends data, so that the data unacknowledged is retransmitted. The TCP protocol must therefore manage a retransmission timer for each connection. The retransmission timer is used whenever TCP expects an acknowledgment from the other side. Upon transmitting some data, TCP tracks a retransmission time-out (RTO) value and a round trip time (RTT) for the given connection. If an acknowledgment is not received by the time the RTO expires, TCP retransmits the data using an exponentially increasing value for the RTO. This doubling is called an "exponential back-off." The RTO is computed as a linear function of the RTT, which is continuously tracked by TCP for each connection. Its value changes over time with changes in routing and network traffic load.

TCP has 'flow control' mechanisms operative at the end stations only to limit the rate at which a TCP endpoint will emit data, but it does not employ explicit data rate control. The basic flow control mechanism is a 'sliding window', a time slot within an allowable window which by its sliding operation essentially limits the amount of unacknowledged transmit data that a transmitter can emit.

Another flow control mechanism is a congestion window, which is a refinement of the sliding window scheme involving a conservative expansion to make use of the full, allowable window. A component of this mechanism is sometimes referred to as 'slow start'.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is retransmitted.

Problems arise in setting a default size for the window. A large window provides a method for overcoming network latency which does not arise from message serialization. In other words, it is data size invariant. Thus, it is useful when multiple packets can be en route between a server and a client with none of the corresponding messages being queued awaiting serialization at some bottleneck link in that path. The window size determines the amount of data that can be sent within the round trip time (RTT). The acknowledgment from the sending of data advances the window, enabling the transmission of the next data packet in sequence.

For example, an 8KB window requires approximately 45 milliseconds to serialize on a T1 link, having a transmission rate of 1.54 Mbps. That same window may take 8 seconds to be serialized on a link having a transmission rate of 9600 bps. At a representative RTT of 90 milliseconds, non-inclusive of message serialization time, the T1 connection will never reach more than half of its potential throughput rate because it will only be able to send packets for 45 milliseconds out of any 90 millisecond RTT period. The RTT will not increase as the window opens from one segment to 8KB. By contrast, the 9600 bps flow will begin to buffer packets as soon as the second packet is added to the window, i.e., en route awaiting acknowledgment. The RTT will increase as packets are added to the window and will approach the 8 second serialization time of the 8KB window. In fact, the majority of the window size is effectively added to RTT, and is buffered rather than being utilized to overcome network latency to achieve a maximum 9600 bps throughput rate.

The forgoing demonstrates that a fixed size window system results in inefficient use of network resources. Previous development efforts have centered about the problems of determining a network link's latency and adjusting corresponding flows accordingly in order to make more efficient use of network resources.

In a copending U.S. patent application Ser. No. 08/742,994, in the name of Robert L. Packer, entitled "Method for Explicit Data Rate Control in a Packet Communication Environment Without Data Rate Supervision," a technique for automatically scheduling TCP packets for transmission is disclosed. Furthermore, in a copending U.S. patent application Ser. No. 08/762,828, in the name of Robert L. Packer, entitled "Method for Rapid Data Rate Detection in a Packet Communication Environment Without Data Rate Supervision," a technique for automatically determining the data rate of a TCP connection is disclosed. Yet further, in a copending U.S. patent application Ser. No.08/970,693, in the name of Robert L. Packer, entitled "Method for Minimizing Unneeded Retransmission of Packets in a Packet Communication Environment Supporting a Plurality of Data Link Rates," filed November 14, 1997, a technique for reducing retransmissions of packets resulting from improperly configured default RTO parameters is described. While these patent applications teach methods for solving problems associated with scheduling transmissions, automatically determining a data flow rate on a TCP connection and determining a default RTO, respectively, there is no teaching in the prior art of methods for explicitly minimizing internal system buffering of TCP packets based upon a minimum window size.

The problem of excessive buffering manifests itself whenever a user clicks on a URL, Uniform Resource Locator, in order to bring new data into her browser, while a current page is still transferring. The system is incapable of responding to the user's request until all buffered packets are flushed from the path. Thus, no response occurs before the data already queued is transferred. Hence, the "world wide wait."

What is needed is a method for managing TCP window size in order to minimize the number of buffered packets on TCP connection based upon automatically determined characteristics of the underlying network connection.

SUMMARY OF THE INVENTION

According to the invention, a method is provided for optimally setting the receiver window size in a flow controlled protocol in order to minimize queuing in a packet telecommunications network. Embodiments according to the present invention are operable at an explicit path to identify per connection information from host address or physical interface, flow direction, or any combination of these elements. The present invention may function in conjunction with a rate detection method that determines both a message serialization delay component and a data size invariant delay component.

An advantage of systems incorporating methods provided by the present invention is that it operates transparently to end systems.

A further advantage of the present invention is that it reduces fixed queue overflow in intermediate network nodes, thus reducing retransmission of packets.

The invention will be better understood upon reference to the following detailed description and its accompanying drawings.

DETAILED DESCRIPTION OF THE SPECIFIC EMBODIMENTS

Hardware Overview

Figure 1A:
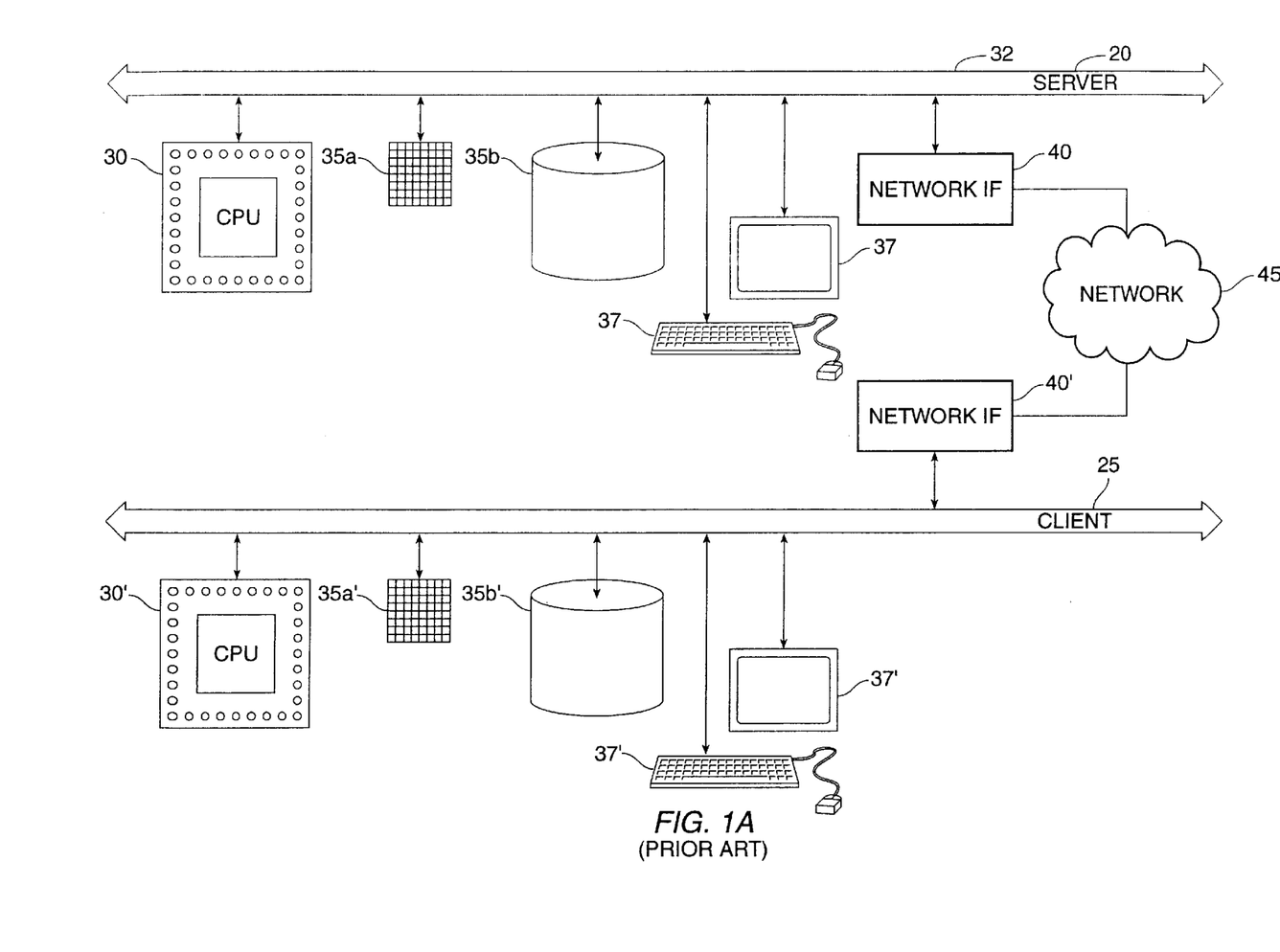
FIG. 1A depicts a representative client server relationship in accordance with a particular embodiment of the invention.

The method for determining an optimal TCP window size in a flow control protocol of the present invention is implemented in the C programming language and is operational on a computer system such as shown in FIG. 1A. This invention may be implemented in a client-server environment, but a client-server environment is not essential. This figure shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprised of a memory subsystem 35a and a file storage subsystem 35b holding computer programs (e.g., code or instructions) and data, a set of user interface input and output devices 37, and an interface to outside networks, which may employ Ethernet, Token Ring, ATM, IEEE 802.3, ITUx0.25, Serial Link Internet Protocol (SLIP) or the public switched telephone network. This interface is shown schematically as a "Network Interface" block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a high-end workstation or mainframe, such as a SUN SPARC server. Corresponding elements and subsystems in the client computer are shown with corresponding, but primed, reference numerals.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
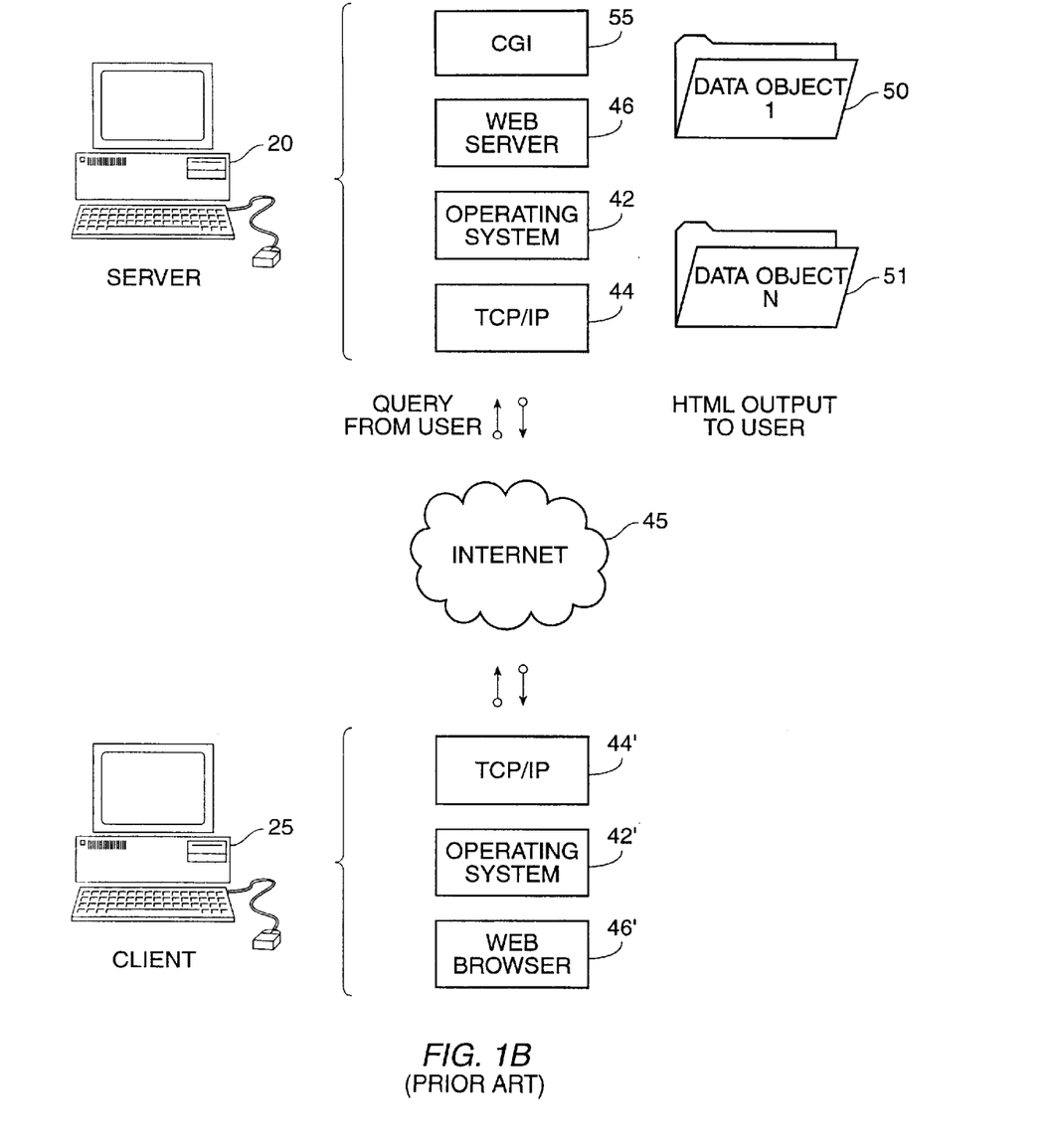
FIG. 1B depicts a functional perspective of the representative client server relationship in accordance with a particular embodiment of the invention.

FIG. 1B is a functional diagram of a computer system such as that of FIG. 1A. FIG. 1B depicts a server 20, and a representative client 25 of a plurality of clients which may interact with the server 20 via the Internet 45 or any other communications method. Blocks to the right of the server are indicative of the processing steps and functions which occur in the server's program and data storage indicated by blocks 35a and 35b in FIG. 1A. A TCP/IP "stack" 44 works in conjunction with Operating System 42 to communicate with processes over a network or serial connection attaching Server 20 to Internet 45. Web server software 46 executes concurrently and cooperatively with other processes in server 20 to make data objects 50 and 51 available to requesting clients. A Common Gateway Interface (CGI) script 55 enables information from user clients to be acted upon by web server 46, or other processes within server 20. Responses to client queries may be returned to the clients in the form of a Hypertext Markup Language (HTML) document outputs which are then communicated via Internet 45 back to the user.

Client 25 in FIG. 1B possesses software implementing functional processes operatively disposed in its program and data storage as indicated by block 35a' in FIG. 1A. TCP/IP stack 44', works in conjunction with Operating System 42' to communicate with processes over a network or serial connection attaching Client 25 to Internet 45. Software implementing the function of a web browser 46' executes concurrently and cooperatively with other processes in client 25 to make requests of server 20 for data objects 50 and 51. The user of the client may interact via the web browser 46' to make such queries of the server 20 via Internet 45 and to view responses from the server 20 via Internet 45 on the web browser 46'.

Network Overview

Figure 1C:
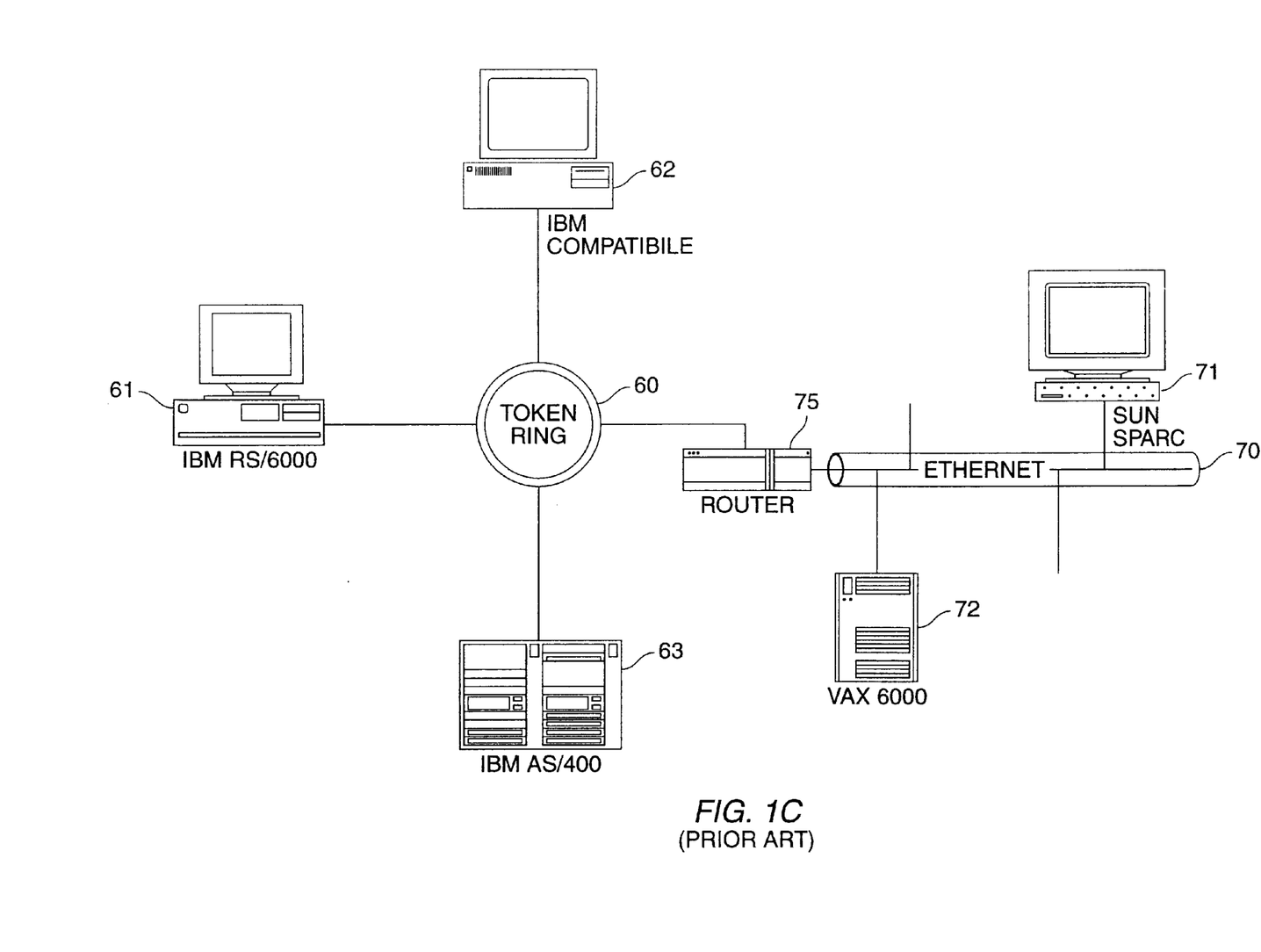
FIG. 1C depicts a representative internetworking environment in accordance with a particular embodiment of the invention.

FIG. 1C is illustrative of the internetworking of a plurality of clients such as client 25 of FIGS. 1A and 1B and a plurality of servers such as server 20 of FIGS. 1A and 1B as described herein above. In FIG. 1C, network 70 is an example of a Token Ring or frame oriented network. Network 70 links host 71, such as an IBM RS6000 RISC workstation, which may be running the AIX operating system, to host 72, which is a personal computer, which may be running Windows 95, IBM OS/2 or a DOS operating system, and host 73, which may be an IBM AS/400 computer, which may be running the OS/400 operating system. Network 70 is internetworked to network 60 via a system gateway which is depicted here as router 75, but which may also be a gateway having a firewall or a network bridge. Network 60 is an example of an Ethernet network that interconnects host 61, which is a SPARC workstation, which may be running SUNOS operating system with host 62, which may be a Digital Equipment VAX6000 computer which may be running the VMS operating system.

Router 75 is a network access point (NAP) of network 70 and network 60. Router 75 employs a Token Ring adapter and Ethernet adapter. This enables router 75 to interface with the two heterogeneous networks. Router 75 is also aware of the Inter-network Protocols, such as ICMP ARP and RIP, which are described herein below.

Figure 1D:
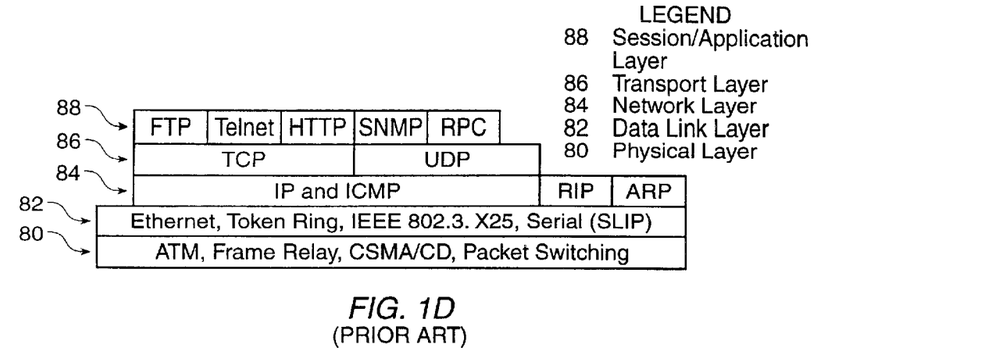
FIG. 1D depicts a relationship diagram of the layers of the TCP/IP protocol suite.

FIG. 1D is illustrative of the constituents of the Transmission Control Protocol/Internet Protocol (TCP/IP) protocol suite. The base layer of the TCP/IP protocol suite is the physical layer 80, which defines the mechanical, electrical, functional and procedural standards for the physical transmission of data over communications media, such as, for example, the network connection 45 of FIG. 1A. The physical layer may comprise electrical, mechanical or functional standards such as whether a network is packet switching or frame-switching; or whether a network is based on a Carrier Sense Multiple Access/Collision Detection (CSMA/CD) or a frame relay paradigm.

Overlying the physical layer is the data link layer 82. The data link layer provides the function and protocols to transfer data between network resources and to detect errors that may occur at the physical layer. Operating modes at the datalink layer comprise such standardized network topologies as IEEE 802.3 Ethernet, IEEE 802.5 Token Ring, ITU×0.25, or serial (SLIP) protocols.

Network layer protocols 84 overlay the datalink layer and provide the means for establishing connections between networks. The standards of network layer protocols provide operational control procedures for internetworking communications and routing information through multiple heterogenous networks. Examples of network layer protocols are the Internet Protocol (IP) and the Internet Control Message Protocol (ICMP). The Address Resolution Protocol (ARP) is used to correlate an Internet address and a Media Access Address (MAC) for a particular host. The Routing Information Protocol (RIP) is a dynamic routing protocol for passing routing information between hosts on networks. The Internet Control Message Protocol (ICMP) is an internal protocol for passing control messages between hosts on various networks. ICMP messages provide feedback about events in the network environment or can help determine if a path exists to a particular host in the network environment. The latter is called a "Ping". The Internet Protocol (IP) provides the basic mechanism for routing packets of information in the Internet. IP is a non-reliable communication protocol. It provides a "best efforts" delivery service and does not commit network resources to a particular transaction, nor does it perform retransmissions or give acknowledgments.

The transport layer protocols 86 provide end-to-end transport services across multiple heterogenous networks. The User Datagram Protocol (UDP) provides a connectionless, datagram oriented service which provides a non-reliable delivery mechanism for streams of information. The Transmission Control Protocol (TCP) provides a reliable session-based service for delivery of sequenced packets of information across the Internet. TCP provides a connection oriented reliable mechanism for information delivery.

The session, or application layer 88 provides a list of network applications and utilities, a few of which are illustrated here. For example, File Transfer Protocol (FTP) is a standard TCP/IP protocol for transferring files from one machine to another. FTP clients establish sessions through TCP connections with FTP servers in order to obtain files. Telnet is a standard TCP/IP protocol for remote terminal connection. A Telnet client acts as a terminal emulator and establishes a connection using TCP as the transport mechanism with a Telnet server. The Simple Network Management Protocol (SNMP) is a standard for managing TCP/IP networks. SNMP tasks, called "agents", monitor network status parameters and transmit these status parameters to SNMP tasks called "managers." Managers track the status of associated networks. A Remote Procedure Call (RPC) is a programming interface which enables programs to invoke remote functions on server machines. The Hypertext Transfer Protocol (HTTP) facilitates the transfer of data objects across networks via a system of uniform resource indicators (URI).

TCP Data Link Rate and Latency Period Determination

In accordance with a particular embodiment of the present invention, the initial default minimum timeout value, or clamp, may be determined automatically from the underlying network using the techniques for automatically determining data rates, as are known in the art, and are more fully set forth in co-owned, copending U.S. patent application Ser. No. 08/762,828, in the name of Robert L. Packer, entitled "Method for Rapid Data Rate Detection in a Packet Communication Environment Without Data Rate Supervision," which is incorporated herein by reference for all purposes.

Figure 2:
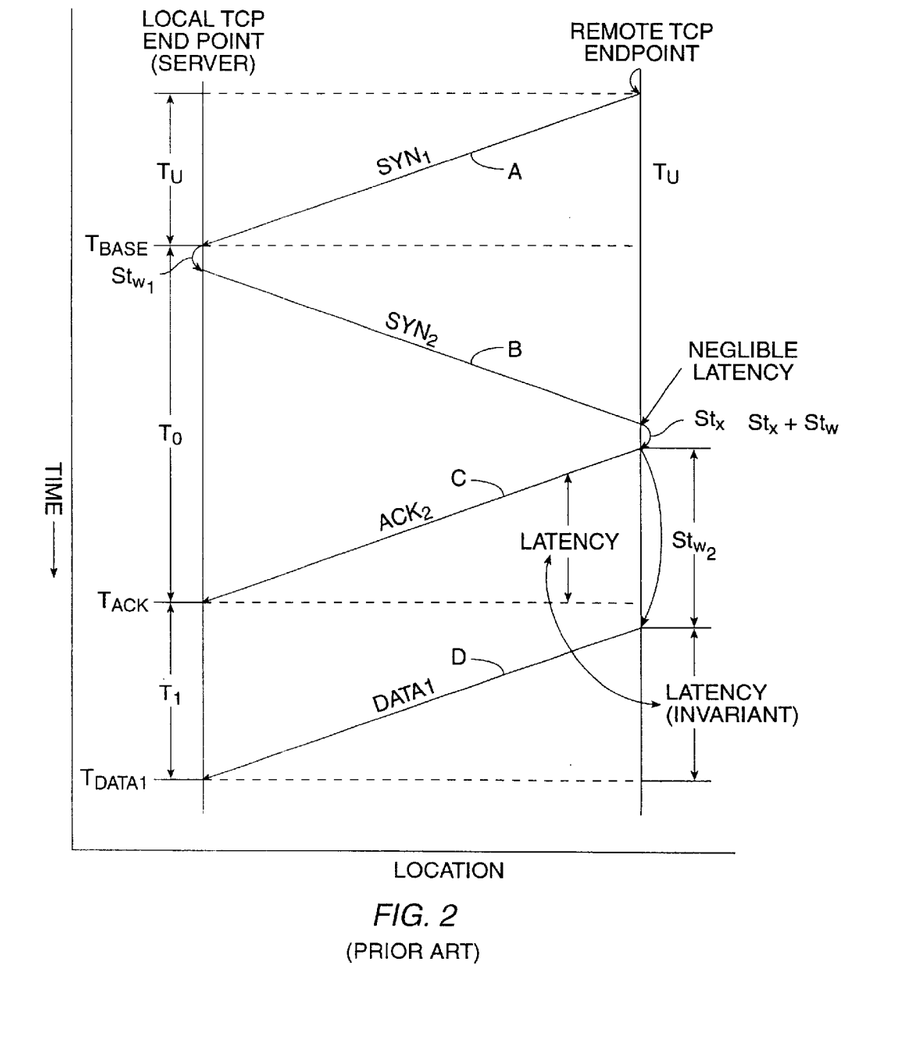
FIG. 2 depicts a two dimensional representation of timing relationships in the exchange of packets between hosts using the TCP protocol.

FIG. 2 depicts a two-dimensional timing diagram illustrative of one particular method for determining a data link rate and latency period from an exchange of packets between TCP endpoints. According to this method, the initial data packets are examined as they establish a connection. Parameters are developed from which round trip time (RTT) and maximum data rate can be determined. The serialization speed (SS) or data flow rate capacity of a link is given by the relation:

$$SS = m/T_1 \quad (1)$$

where:
  m=number of bytes in the first data packet (Data1)
  $T_1$=The arrival time of the first data packet less the time of arrival of the ACK packet ($T_{data1} - T_{ACK}$)

FIG. 2 shows a two dimensional timing diagram of the connection protocol of a remote HTTP request between a local TCP endpoint (server) and a remote TCP endpoint (client). The remote endpoint issues a request for connection in the form of a SYN packet in step A. The SYN packet takes a finite but unknown transit time to arrive at the local TCP endpoint. The local TCP endpoint responds by sending its own SYN packet in step B. This SYN packet is of a known byte length and is issued at a known time, which becomes the reference time, "tbase." After a brief latency, the remote TCP endpoint issues a standard ACK packet, whose length is likewise known, in step C, and then also issues the first data packet data1 in step D.

Time $T_1$ is computed immediately at the time of arrival of data1 by examining the difference in arrival time of the received ACK packet and the data1 packet. The value of m is extracted by examining the entire first packet to determine its length or by examining the packet length field, if any, in the header information of the packet. A first estimate of serialization speed SS is given by Equation (1). Serialization speed can be estimated immediately upon interchange of the first packets and used to make important strategic decisions about the nature and speed of the connection about to be established.

An alternative method for determining a data link rate and latency period from an exchange of packets between TCP endpoints develops parameters from which round trip time (RTT) and maximum data rate can be determined. Values are obtained for serialization of n, the size (i.e., data length) of the SYN packet in response, plus the size (i.e., data length) of the ACK packet. Serialization time is determined according to Equation (2) by dividing the value n by the transit time $T_0$, or $$SS(\text{max possible}) = n/T_0 \quad (2)$$

where
  n=number of bytes in the SYN packet plus the number of bytes in the ACK packet and
  $T_0$=the arrival time of the ACK packet less the tbase value.

The round trip time minus the serialization time is the round trip latency $T_d$, as shown in Equation (3)

$$T_d = RTT - SS(\text{max Possible}) \quad (3)$$

Determining an Optimal Window Size

Figure 3A:
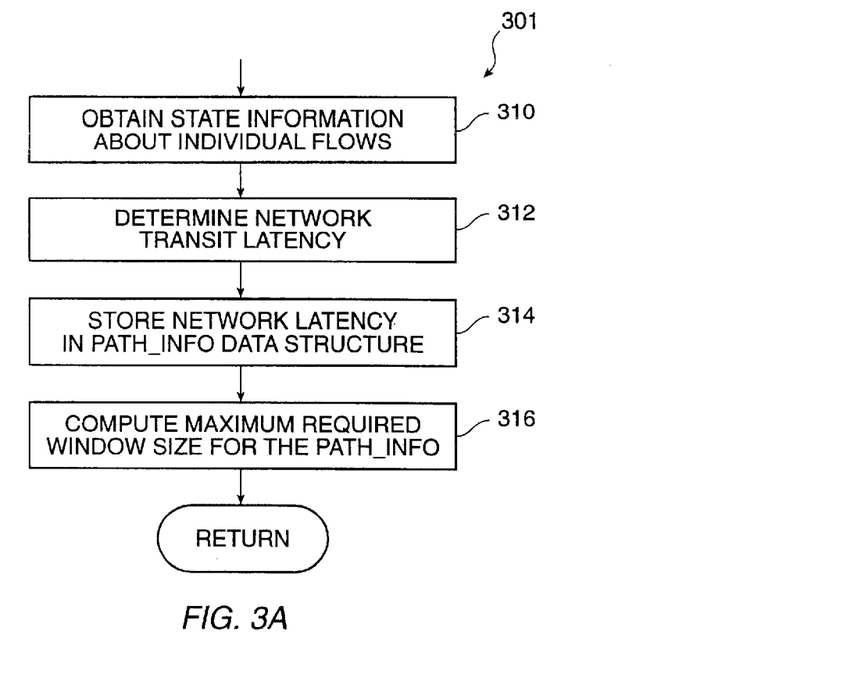
FIGS. 3A and 3B depict flowcharts of processing steps according to a particular embodiment of the invention.

FIG. 3 depicts a flowchart 301 of a particular embodiment of the invention. In a step 310, individual network flows are recognized and state information about connections is initialized. Next in a step 312, serialization and network transit latency are determined. In a preferable embodiment, the data rate for the connection is dynamically and rapidly detected by re-computing values for RTT periodically from latency data as described in Equations (1) to (3) and depicted in FIG. 2. In select embodiments, RTT may be estimated by the connection latency, $T_1$. A useful value for RTT can be computed on these values using any of a number of techniques as are well known in the art. In a related embodiment, RTT may be estimated from the round trip latency, $T_d$, and the serialization time, SS, as described in Equation (3). A value for RTT may computed on this value using any of a number of techniques as are well known in the art. Next, in a step 314, the network latency computed in step 312 is stored in a data structure for containing path information. Subsequently, in a step 316, the optimal window size is computed using a conservative assumption about network transit latency, for example that network latency may increase significantly up to some limit, e.g. 500 milliseconds, and taking into account the possibility of variable data compression at a dial link. The optimal window size may be computed according to the relationship in Equation (4):

$$N = 2L/\text{st(mss)} + 1 \quad (4)$$

where N is the optimal window size in number of segments, L is a transit latency and st(mss) is a serialization time for a single segment.

Figure 3B:
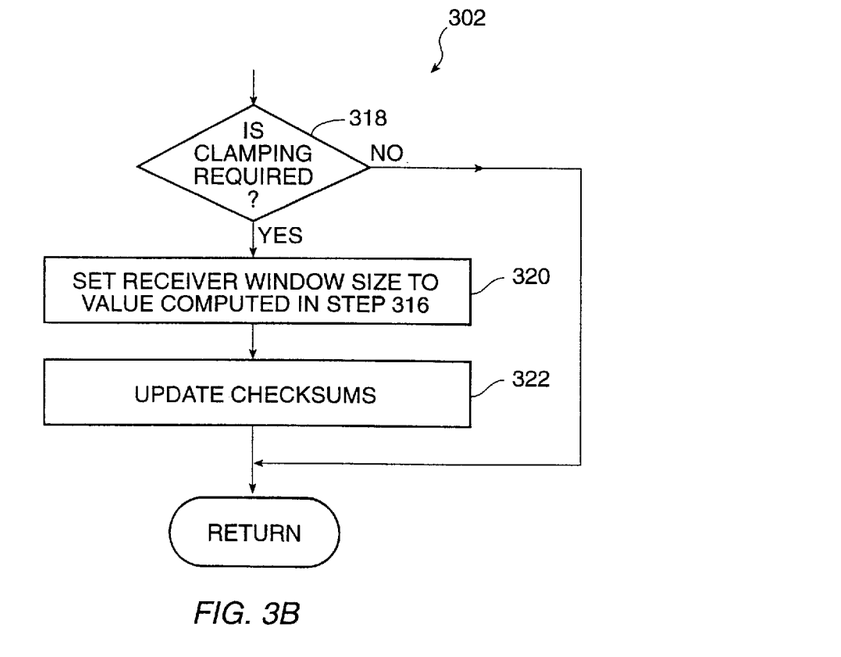

FIG. 3B depicts a flowchart 302, having a decisional step 318, in which a determination is made whether a clamp is required for a particular connection. Window sizes which are greater than the optimal size computed in step 316 will be clamped. Windows of equal or lesser size are unchanged. If no clamp is required, processing returns. Otherwise, in a step 320, a receiver window size associated with the connection is clamped to the value calculated in step 316 above. Next, in a step 322, checksums contained within the TCP header of packets associated with this flow are updated before forwarding the packet.

In an alternative embodiment, in an alternate step 312, the flow is associated with a static value which the user configures for the path based on host or direction or interface or other criteria.

The appended pseudocode depicts processing as described herein above according to a particular embodiment of the invention. Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

APPENDIX A

```c
/************************************************************
**
*
* file: minwin.c
*
* description: TCP Window Minimizer
*
* These hooks are called from tcpProcessData( ) to minimize
* TCP window size. MinWin, like RTOCLAMP, is independent of
* policy, rate enforcement, etc... MinWin is active when
* shaping is ON and when so DIRECTION is so configured.
*
* TCP MinWin is for large windows flowing towards low speed
* access links, e.g. dial. TCP MinWin prevents excessive buffering
* and queue depth caused by unnecessarily large default window
* sizes.
*
*
* author: bp
* date: 3/1/98
*
* 03/05/98 Copyright Packeteer, Inc. 1997-98 @(#)minwin.c 1.4
************************************************************
**
*/
#include <global.h>
#include <buf.h>
#include <conn.h>
#include <bwpool.h>
#include "tcp.h"
#include <schedule.h>
#include "hostdb.h"
#include <merecord.h>
#include <flow.h>
#include "tcpdebug.h"
#define MINWIN_LAT_MIN 80
#define MINWIN_LAT_MAX 400
/*
* Speed above which we don't even try...
*/
#define MINWIN_SPEED_THRESH 64000
/*
* Enabled direction means for ACKs moving in this direction, i.e.
* for DATA moving in the opposite direction.
*
* Make this a sys variable. MINWIN_STATIC is a hard coded window
*value...
*/
#define MINWIN_NONE 0
#define MINWIN_DYNAMIC 1
INT32 gTcpMinWinState[NUM_DIRECTIONS] = {MINWIN_NONE,
MINWIN_NONE};
#define minWinMibClampedAcks minWinMib[0].value.integer
#define minWinMibClampedAckConns minWinMib[1].value.integer
#define minWinMibClampedAckRecalcs minWinMib[2].value.integer
MIB_ENTRY minWinMib[ ] = {
  {"clampedAcks", 0, 0},
  {"clampedAckConns", 0, 0},
  {"clampAckRecalcs", 0, 0},
   {NULL, 0, 0}
};
/************************************************************
**
*
* tcpMinWinAck(tcb, bcb, tcpHdr, fresh)
*
* Clamp advertised window for advanced ACK seq if data is flowing in
```

APPENDIX A-continued

```
large
 * window TOWARDS a low speed access link.
 ***************************************************************
 **
 */
void
tcpMinWinFreshAck(TCB *tcb, BCB *bcb, TCP_HDR *tcpHdr)
{
 whereStr("tcpMinWinFreshAck");
 SPEED speed;
 TICK_DURATION latency;
 int dir = bcb->fspec.direction;
 int confidence, mode, n, first;
HALF_CONN_INFO *hci;
INT32 stMss, clampWindow;
mode = gTcpMinWinState[dir];
/*
 * MinWin enabled for clamping rx advertised window in this direction?
 */
if (! IS_CONTROL_TRAFFIC_MODE || mode = = MINWIN_NONE) return;
hci = &tcb->halfConns[dir];
/*
 * Adjust for window scaling ???
 */
/*
 * Static, i.e. always do it...
 */
if (mode > MINWIN_DYNAMIC)
clampWindow = mode;
else {
/*
 * Dynamic - get host/path info...
 */
hostdbGetSpeed(tcb->hosts[DIR_TO_SRC_CONN_IDX(dir)],
    tcb->conn.addr[DIR_TO_SRC_CONN_IDX(dir)],
    &speed,
    &latency,
    &confidence);
/*
 * If its high speed, there's no clamping...
 */
if (speed >= MINWIN_SPEED_THRESH || speed = = SPEED_CANT_DETECT)
return;
/*
 * Already know what to do ?
 */
if (speed = =hci->winClamp.lastSpeed)
clampWindow = hci->winClamp.lastClampSize;
/*
 * New speed?
 */
else {
 * if (hci->winClamp.lastSpeed != 0) minWinMibClampedAckRecalcs ++;
/*
 * Calculate desired clamp.
 *
 * Latency is clamped between 80 ms and 400 ms.
 *
 * st(mss) is the serialization time of a single segment.
 *
 * we are solving for the number of segments in the required
 * window for a round trip, or
 *
 * N*st(mss) = 2L
 *
 *     or
 *
 * N = 2L/st(mss) + 1
 */
latency = max(latency, MINWIN_LAT_MIN);
latency = min(latency, MINWIN_LAT_MAX);
stMss = SERIAL_TIME(hci->mss, speed);
n = ((2*latency)/stMss) + 1;
/*
 * Clamp N...
 */
n = min(2, n);
clampWindow = hci->mss * n;
/*
```

APPENDIX A-continued

```
* Be conservative if confidence in speed estimate is low...
*/
/*
* And set new values in persistent half conn state...
*/
hci->winClamp.lastClampSize = clampWindow;
hci->winClamp.lastSpeed = speed;
}
}
/*
* Update physical and logical headers if clamp is below actual...
*/
if (clampWindow < tcpHdr->wnd){
put16((void *)&tcpHdr->wnd, clampWindow);
checksumUpdate(&bcb->protHdrStart[16], &bcb->protHdrStart[14], 2,
    (void *)&tcpHdr->wnd, 2);
put16(&bcb->protHdrStart[14], tcpHdr->wnd = clampWindow);
minWinMibClampedAcks + +;
if (hci->winClamp.cnt+ + = = 0) minWinMibClampedAckConns + +;
}
/*
* ???? support segment squeezing per host IF VoIP present
*/
}
void
tcpWinInitialMss(TCB *tcb, BCB *bcb, TCP_HDR *tcpHdr)
{
}
```

What is claimed is:

1. A method for minimizing queuing of data on a transmission link in a digital data packet communication environment having an arbitrary and unknown plurality of digital packet transmission stations interconnectable in data paths through a network, each said data path having associated therewith a flow of data comprising packets, wherein said data packet communication environment uses a sliding window method of rate control wherein a receiver sends a value for a window back to a sender as a receiver-advertised window, wherein said receiver-advertised window is associated with each packet of said particular flow along each said data path, said method comprising the steps of:

for each particular flow of data and concurrent with a first packet exchange in said flow of data between said sender and said receiver connected via a particular data path, determining a network transit latency; thereupon computing an optimal window value from said network transit latency for said data path independent of knowledge of number and latency of intermediate digital packet transmission stations, said optimal window value retaining validity for duration of said flow of data; thereupon determining on each said packet of said particular flow from said receiver to said sender using a receiver-advertised window value, whether said receiver-advertised window value for said packet is greater than said optimal window value; and if true thereupon, setting said receiver-advertised window to said optimal window value in order to override said receiver-advertised window.

2. The method of claim 1 further comprising the step of: updating state information in data packets associated with said flow.

3. The method of claim 1 further wherein said digital data packet communication environment is an Internet Protocol (IP) message.

4. The method of claim 1 wherein said digital data packet communication environment is a Transmission Control Protocol (TCP) connection.

5. The method of claim 1 wherein said digital data packet communication environment is a User Datagram Protocol (UDP) session.

6. The method of claim 1 further comprising the step of: determining said network latency based upon user input.

7. The method of claim 1 further comprising the step of: determining said network latency based upon ascertainable factors about the underlying connection activity.

8. A system for transmitting data with minimal queuing on a transmission link in a digital data packet communication environment having an arbitrary and unknown plurality of digital packet transmission stations interconnectable in data paths through a network, each said data path having associated therewith a flow of data comprising packets, wherein said data packet communication environment uses a sliding window method of rate control wherein a receiver sends a value for a window back to a sender as a receiver-advertised window, wherein said window is associated with each packet of said particular flow along each said data path, said system comprising:

a sender;

a receiver, connected to said sender via a particular data path, said receiver operative to:

for each particular flow of data and concurrent with a first packet exchange in said flow of data between said sender and said receiver connected via a particular data path, determine a network transit latency;

compute an optimal window value from said network transit latency for said data path independent of knowledge of number and latency of intermediate digital packet transmission stations, said optimal window value retaining validity for duration of said flow of data;

determine on each said packet of said particular flow from said receiver to said sender using a receiver-advertised window value, whether said receiver-advertised window value for said packet is greater than said optimal window value; and if true thereupon, set said receiver-advertised window to said optimal window value in order to override said receiver-advertised window.

9. The system of claim 8 wherein said receiver is further operative to:

update state information in data packets associated with said flow.

10. The system of claim 8 further wherein said digital data packet communication environment is an Internet Protocol (IP) message.

11. The system of claim 8 wherein said digital data packet communication environment is a Transmission Control Protocol (TCP) connection.

12. The system of claim 8 wherein said digital data packet communication environment is a User Datagram Protocol (UDP) session.

13. The system of claim 8 wherein said receiver is further operative to:

determine said network latency based upon user input.

14. A method for minimizing queuing of data on a transmission link in a digital data packet communication environment having an arbitrary and unknown plurality of digital packet transmission stations interconnectable in data paths through a network, each said data path having associated therewith a flow of data, wherein said data packet communication environment uses a sliding window method of rate control, wherein a window is associated with each said particular flow along each said data path, said method comprising the steps of:

for a particular flow of data, determining a network transit latency;

computing an optimal window value from said network transit latency according to the following relation:

$$N=2L/st(mss)+1$$

where

N is the optimal window size in number of segments,

L is network transit latency and st(mss) is a maximum serialization time for a single segment, given as roundtrip time less a first derived serialization time, and wherein said first derived serialization time is the number of bytes in a first data packet divided by difference in arrival time of the first data packet and arrival time of a next preceding received acknowledgment packet;

determining on a particular flow, whether said window is different from said optimal window value; thereupon, setting said window to at most said optimal window value.

15. A method for minimizing queuing of data on a transmission link in a digital data packet communication environment having an arbitrary and unknown plurality of digital packet transmission stations interconnectable in data paths through a network, each said data path having associated therewith a flow of data, wherein said data packet communication environment uses a sliding window method of rate control, wherein a window is associated with each said particular flow along each said data path, said method comprising the steps of:

for a particular flow of data, determining a network transit latency;

computing an optimal window value from said network transit latency without reference to juxtaposition of acknowledgment packets and data packets according to the following relation:

$$N=2L/st(mss)+1$$

where

N is the optimal window size in number of segments,

L is network transit latency and st(mss) is a maximum serialization time for a single segment, given as roundtrip time less a second derived serialization time, and wherein the second derived serialization time is the sum of the number of bytes in a synchronization packet and the number of bytes in a corresponding acknowledgment packet, divided by difference in arrival time of the acknowledgment packet and time of transmittal of the acknowledgment packet.

\* \* \* \* \*